US012611886B2

(12) United States Patent
Johnson

(10) Patent No.: US 12,611,886 B2
(45) Date of Patent: Apr. 28, 2026

(54) PERSONALIZED PLASTIC IDENTIFICATION DOCUMENT WITH LENS STRUCTURE

(71) Applicant: Entrust Corporation, Shakopee, MN (US)

(72) Inventor: Peter Johnson, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 18/183,616

(22) Filed: Mar. 14, 2023

(65) Prior Publication Data

US 2023/0294445 A1     Sep. 21, 2023

Related U.S. Application Data

(60) Provisional application No. 63/319,904, filed on Mar. 15, 2022.

(51) Int. Cl.
| | |
|---|---|
| *B42D 25/36* | (2014.01) |
| *B41M 5/26* | (2006.01) |
| *B42D 25/23* | (2014.01) |
| *B42D 25/24* | (2014.01) |
| *B42D 25/351* | (2014.01) |
| *B42D 25/41* | (2014.01) |
| *G02B 3/00* | (2006.01) |

(52) U.S. Cl.
CPC ............. *B42D 25/36* (2014.10); *B41M 5/267* (2013.01); *B42D 25/23* (2014.10); *B42D 25/24* (2014.10); *B42D 25/351* (2014.10); *B42D 25/41* (2014.10); *G02B 3/0025* (2013.01); *G02B 3/0043* (2013.01)

(58) Field of Classification Search
CPC ........ B42D 25/36; B42D 25/23; B42D 25/24; B42D 25/351; B42D 25/41; B41M 5/267; B41M 5/26; G02B 3/0043; G02B 3/00
USPC ..... 281/2, 5; 283/67, 70, 72, 74, 75, 77, 81, 283/94, 98, 901
See application file for complete search history.

(56) References Cited

U.S. PATENT DOCUMENTS

| | | | |
|---|---|---|---|
| 4,825,054 | A | 4/1989 | Rust et al. |
| 4,995,501 | A | 2/1991 | Lundstrom et al. |
| 5,266,781 | A | 11/1993 | Warwick et al. |
| 5,837,991 | A | 11/1998 | LaManna et al. |
| 6,131,817 | A | 10/2000 | Miller |
| 6,783,067 | B2 | 8/2004 | Kreuter et al. |
| 6,902,107 | B2 | 6/2005 | Shay et al. |

(Continued)

FOREIGN PATENT DOCUMENTS

EP     1698485 A2     6/2006

OTHER PUBLICATIONS

International Search Report and Written Opinion, International Patent Application No. PCT/IB2023/052480, Jun. 26, 2023 (10 pages).

(Continued)

*Primary Examiner* — Justin V Lewis
(74) *Attorney, Agent, or Firm* — Merchant & Gould P.C.

(57)     ABSTRACT
A security feature on a personalized plastic identification document such as a personalized plastic card and a plastic page of passport. The security feature includes a lens structure with a plurality of lenses, where the lens structure is formed using a laser at a location on the personalized plastic identification document to facilitate viewing of a security feature underlying the lens structure.

9 Claims, 7 Drawing Sheets

(56)                    References Cited

U.S. PATENT DOCUMENTS

| | | | |
|---|---|---|---|
| 7,398,972 | B2 | 7/2008 | Schuller et al. |
| 7,434,728 | B2 | 10/2008 | Paulson et al. |
| 11,052,697 | B2 | 7/2021 | Van Dijk et al. |
| 2005/0160294 | A1 | 7/2005 | Abrec et al. |
| 2006/0197337 | A1* | 9/2006 | Merry ................... B42D 25/00 |
| | | | 283/109 |
| 2007/0058260 | A1 | 3/2007 | Steenblik et al. |
| 2007/0187870 | A1 | 8/2007 | Lundstrom et al. |
| 2008/0284157 | A1* | 11/2008 | Muke ....................... B41M 5/26 |
| | | | 283/86 |
| 2014/0151996 | A1 | 6/2014 | Camus |
| 2015/0210107 | A1 | 7/2015 | Nugent et al. |
| 2015/0360501 | A1 | 12/2015 | Van Den Berg |
| 2017/0242329 | A1* | 8/2017 | Chien .................. G02B 5/1885 |
| 2018/0141362 | A1* | 5/2018 | Wesselink ................ B41M 5/24 |

OTHER PUBLICATIONS

"Document Security", GSSC, 5 pages (2021).
Extended European Search Report for PCT Application No. PCT/
IB2023/052480, Jan. 9, 2026, 9 pages.

* cited by examiner

PERSONALIZED PLASTIC IDENTIFICATION DOCUMENT WITH LENS STRUCTURE

FIELD

This technical disclosure relates to security features on personalized plastic identification documents such as personalized plastic cards and plastic pages of passports.

BACKGROUND

Identification documents such as identification cards, credit and debit cards, driver's licenses, and the like, and passports, are personalized with information concerning the intended holder of the identification document and then issued to the intended holder. Personalization and issuance are typically handled by government agencies, credit card companies, or other entities authorized to handle the personalization and issuance process. As part of the personalization and issuance process, the identification documents can undergo a number of processing procedures, including printing, portrait printing, magnetic stripe encoding, integrated circuit chip programming, embossing, lamination of protective laminates, and other known procedures.

A number of security measures have been implemented on these types of identification documents in order to resist counterfeiting, forgery or tampering with the identification documents, as well as resist fraudulent use of identification documents once issued.

SUMMARY

A number of security features used on personalized plastic identification documents such as personalized plastic cards and plastic pages of passports are described herein. The security features include a lens structure with a plurality of lenses, where in one embodiment the lens structure is formed using a laser at a location on the personalized plastic identification document to facilitate viewing of a security feature underlying the lens structure.

In an embodiment, the security feature may be printed text including, but not limited to, alphanumeric text and/or a text symbol(s), that is formed by a laser within a printed image of the intended holder of the personalized plastic identification document. The printed image and the printed text may be formed in a laser receptive layer of the identification document.

In another embodiment, the identification document can include a security feature, such as a security image, formed thereon, and the lens structure can overlay some or all of the security feature. The security feature can be an image of the intended document holder, text, a combination of an image of the intended document holder and text, a multiple laser image/changeable laser image (an MLI/CLI security image), or any other security feature.

In one embodiment, a personalized plastic identification document can include a plastic identification document substrate having an image of an intended holder of the personalized plastic identification document formed thereon and text formed within the image. In addition, a layer is disposed on the plastic identification document substrate, and the layer includes a lens structure that overlays at least a portion of the image and at least a portion of the text formed on the image, and the lens structure comprises a plurality of lenses.

In another embodiment, a personalized plastic identification document can include a plastic identification document substrate having a security feature formed thereon. In addition, a layer is disposed on the plastic identification document substrate, where the layer includes a lens structure that overlays at least a portion of the security feature, and the lens structure comprises a plurality of lenses. In an embodiment, the security feature is located on one side of the document, for example on a top or bottom surface, while the lens structure is formed on an opposite side of the document, for example on a bottom or top surface.

In another embodiment, a method of processing a plastic identification document substrate to create a personalized plastic identification document can include using a laser to form a lens structure on the plastic identification document substrate, where the lens structure comprises a plurality of lenses. Thereafter, a laser is used to form an image of an intended holder of the personalized plastic identification document on the plastic identification document substrate along with text within the image, wherein the image and the text are positioned to at least partially underlie the lens structure.

Personalized plastic identification cards described herein include, but are not limited to, financial (e.g., credit, debit, or the like) cards, access cards, driver's licenses, national identification cards, and business identification cards, and other plastic identification cards that can benefit from having one or more security features described herein added to the plastic card. In an embodiment, the plastic identification cards may be ID-1 cards as defined by ISO/IEC 7810. However, other card formats such as ID-2 as defined by ISO/IEC 7810 are possible as well. The passport pages can be a front cover or a rear cover of the passport, or an internal page (for example a plastic page referred to as a data page) of the passport. In an embodiment, the passports may be in an ID-3 format as defined by ISO/IEC 7810.

DRAWINGS

Figures 6, 7:
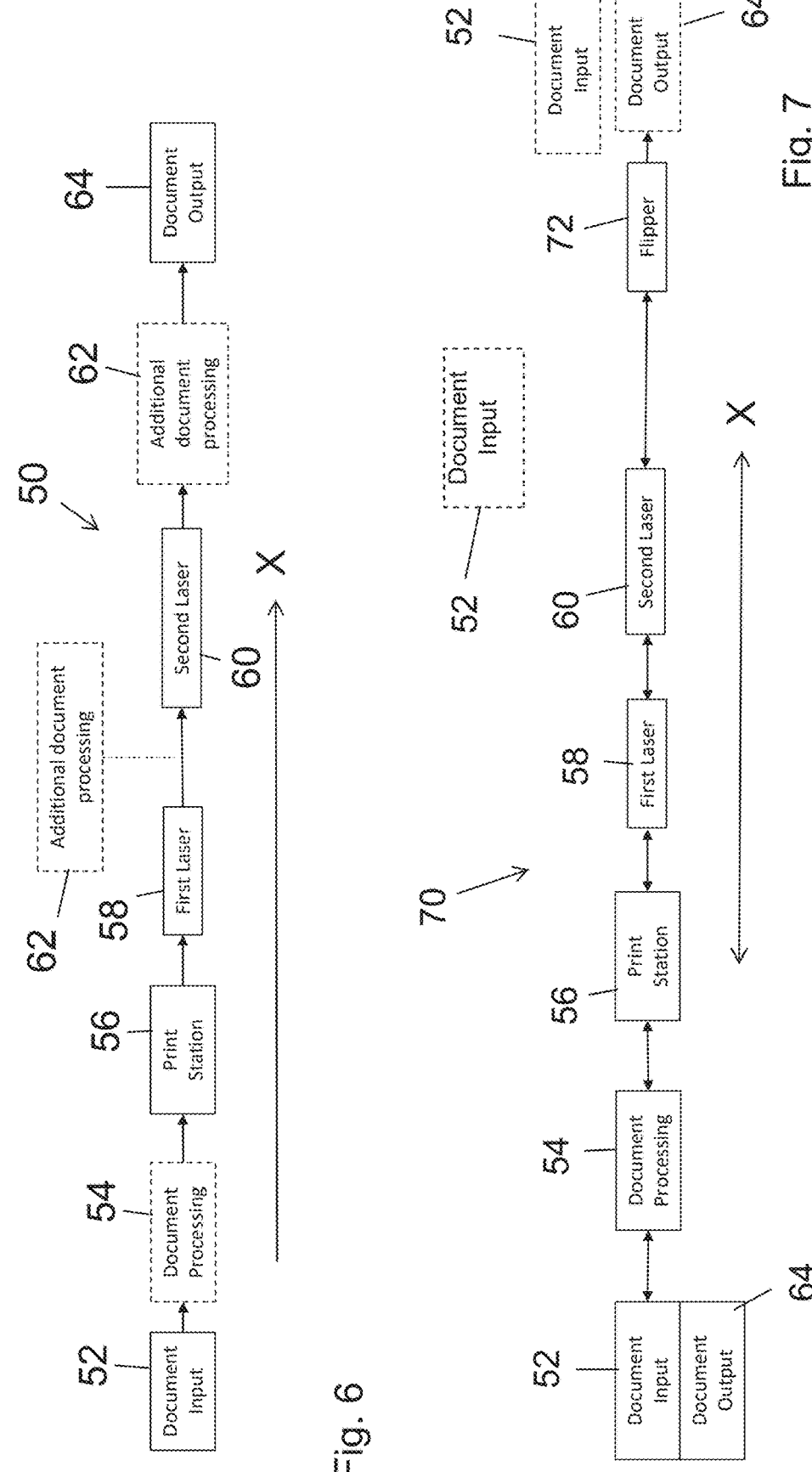

FIG. 6 schematically depicts a personalized plastic identification document processing system that can be used to personalize the identification documents described herein.

FIG. 7 schematically depicts another embodiment of a personalized plastic identification document processing system that can be used to personalize the identification documents described herein.

Figure 8:
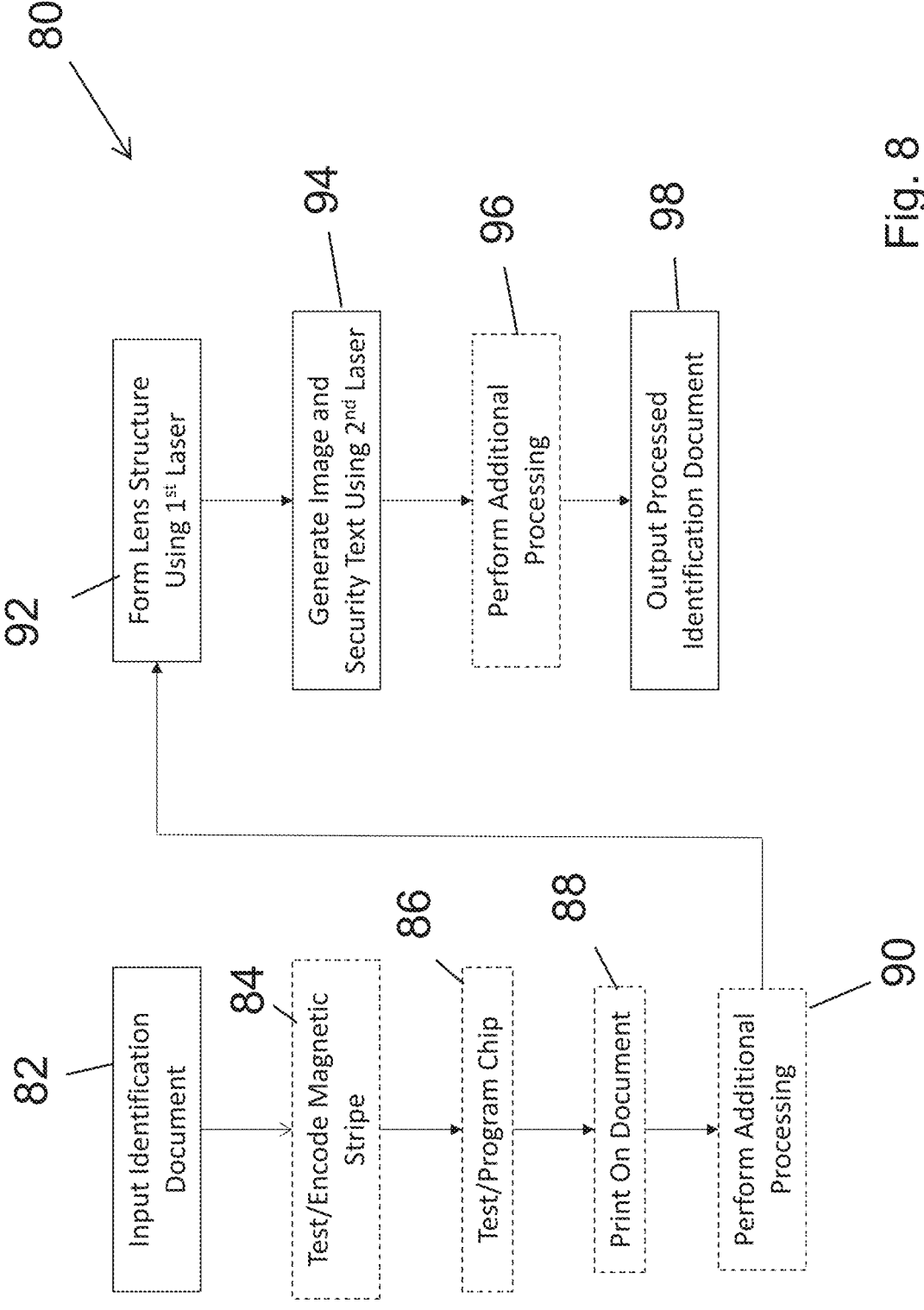

FIG. 8 illustrates a method of processing an identification document described herein.

DETAILED DESCRIPTION

Personalized plastic identification documents are described that include a lens structure having a plurality of lenses. The lens structure is formed on the document using a laser and is formed at a location on the document to facilitate viewing of a security feature that is formed on the identification document at a location underlying the lens structure. Without the lens structure, one may be able to discern, with the naked eye (i.e. the unaided eye), that the security feature is present, or the security feature may not at all be discernible to the naked eye or the security feature is not clearly discernible to the naked eye. In other words, without the lens structure, the security feature cannot be read using the naked eye and the image incorporating the security feature looks generally like a standard image when viewed with the naked eye. With the lens structure present, some or all of the security feature is discernible or visible to the naked eye, and some or all of the security feature can be read using the naked eye via the lens structure.

Identification documents include personalized plastic identification cards and plastic pages of passports. Personalized plastic identification cards described herein include, but are not limited to, financial (e.g., credit, debit, or the like) cards, access cards, driver's licenses, national identification cards, and business identification cards, and other plastic identification cards that can benefit from having one or more security features described herein added to the plastic card. In an embodiment, the plastic identification cards may be ID-1 cards as defined by ISO/IEC 7810. However, other card formats such as ID-2 as defined by ISO/IEC 7810 are possible as well. The passport pages can be a front cover or a rear cover of the passport, or an internal page (for example a plastic page referred to as a data page) of the passport. In an embodiment, the passports may be in an ID-3 format as defined by ISO/IEC 7810.

For sake of convenience in describing the concepts herein, the following description and the drawings describe the identification document as being a plastic card. However, as indicated above, the techniques described herein are applicable to plastic pages of passports on which a security feature can be formed.

The term "plastic cards" as used throughout the specification and claims, unless indicated otherwise, refers to cards where the card substrate can be formed entirely of plastic, or formed of a combination of plastic and non-plastic materials. In one embodiment, the cards can be sized to comply with ISO/IEC 7810 with dimensions of about 85.60 by about 53.98 millimeters (about 3⅜ in×about 2⅛ in) and rounded corners with a radius of about 2.88-3.48 mm (about ⅛ in). As would be understood by a person of ordinary skill in the art of plastic identification cards, the cards are typically formed of multiple individual layers that form the majority of the card body or the card substrate. Similarly, the term "plastic page" of a passport refers to passport pages where the passport can be formed entirely of plastic, or formed of a combination of plastic and non-plastic materials. An example of a plastic passport page is the data page in a passport containing the personal data of the intended passport holder. The passport page may be a single layer or composed of multiple layers. Examples of plastic materials that the card or passport page, or the individual layers of the card or passport can be formed from include, but are not limited to, polycarbonate, polyvinyl chloride (PVC), polyester, acrylonitrile butadiene styrene (ABS), polyethylene terephthalate glycol (PETG), TESLIN®, combinations thereof, and other plastics.

As used herein, the term "processing" (or the like) as used throughout the specification and claims, unless indicated otherwise, is intended to encompass operations performed on a card that includes operations that result in personalizing the card as well as operations that do not result in personalizing the card. An example of a processing operation that personalizes the card is creating the cardholder's image or name on the card. An example of a processing operation that does not personalize the card is applying a laminate to the card or printing non-cardholder graphics on the card. The term "personalize" is often used in the card industry to refer to cards that undergo both personalization processing operations and non-personalization processing operations.

Figure 1:
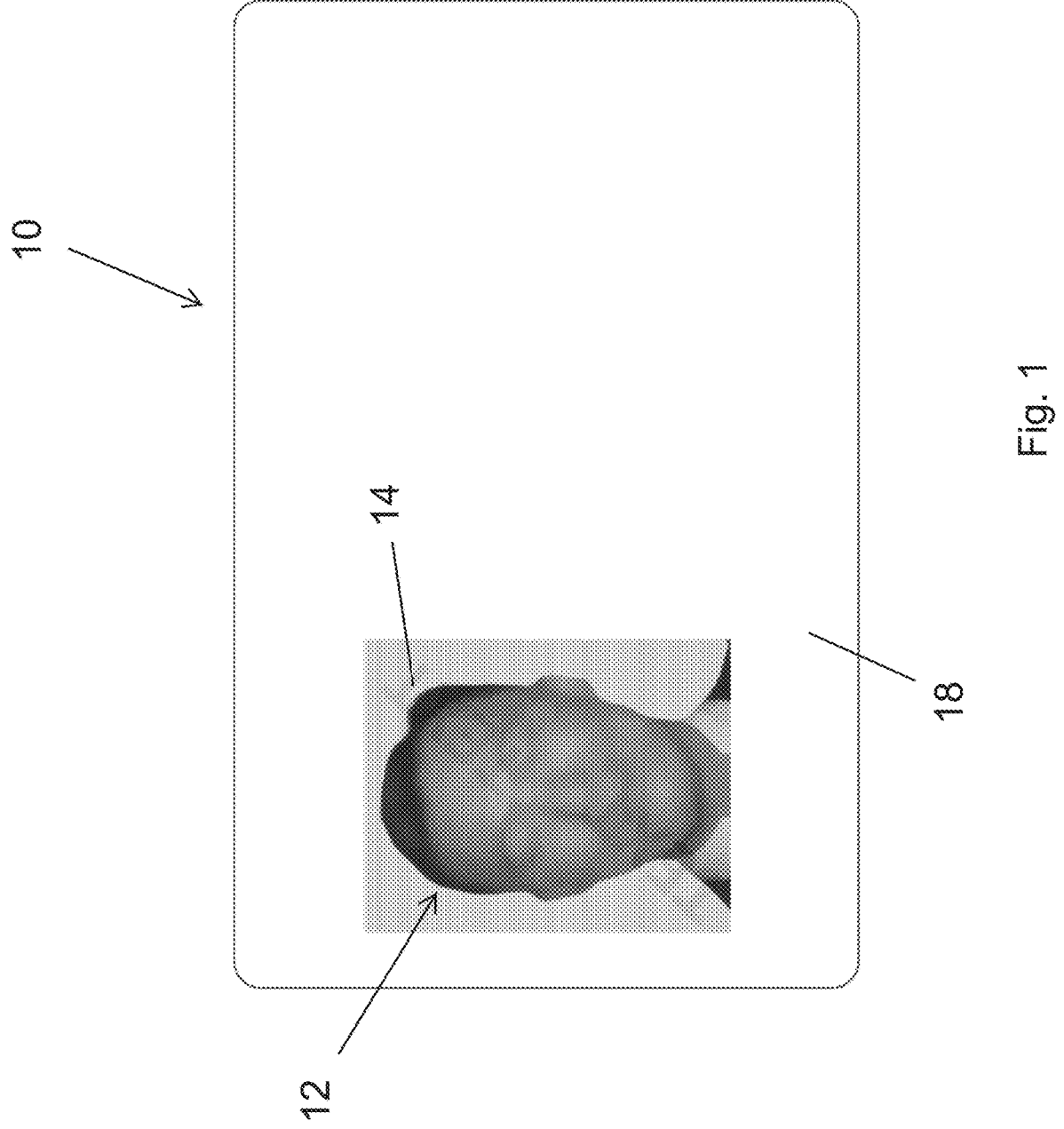
FIG. 1 is a top view of a personalized plastic identification document in the form of a plastic identification card with an image of the intended holder of the document and security text within the image without the lens structure over the image and security text.

FIG. 1 illustrates a plastic card 10 that includes a printed image 12 and a security feature in the form of security text 14 is incorporated within the image 12 without a lens structure described further below over the image 12 and the security text 14. In FIG. 1, the security text 14 is depicted as being visible solely for the purposes of explaining the concepts herein. However, in actual practice, without the lens structure, the printed image 12 may look generally like a standard printed image when viewed with the naked eye (i.e. the unaided eye), and one may be able to discern, with the naked eye, that the security text 14 is present, or the security text 14 may not at all be discernible to the naked eye or the security text 14 is not clearly discernible to the naked eye. However, without the lens structure, the security text 14 cannot be read using the naked eye. With the lens structure present as described below with respect to FIG. 2, the security text 14 is discernible or visible to the naked eye through the lens structure, and the security text 14 can be read using the naked eye via the lens structure.

In one embodiment, the image 12 and the security text 14 can both be generated in a laser receptive layer 16 (see FIG. 3) of the card 10 via laser marking using a laser. In laser marking, the laser beam from the laser causes a darkening of the material of the laser receptive layer 16 contacted by the laser beam. Laser marking of a laser receptive layer using a laser is well known in the art. An example of a suitable laser that can be used to form the image 12 and the security text 14 can be found in the MX6100 Card Personalization System available from Entrust Corporation of Shakopee, Minnesota. The image 12 and the security text 14 may be formed simultaneously, or the image 12 and the security text 14 may be formed separately from one another. Techniques for combining an image and security text together are known in the art including using software available from Graphic Security Systems Corporation of Lake Worth, Florida.

The image 12 is depicted as being a portrait image showing the face of the intended holder of the card 10. The security text 14 can be alphanumeric text, alphabetical text, numerical text, one or more text symbols, and combinations thereof. The security text 14 may be personalized text, i.e. text that is specific or personal to the intended card holder. For example, the security text 14 may comprise the name of the intended card holder. The image 12 and the text 14 may be visible from a front surface 18 of the card 10. Alternatively, the image 12 and the text 14 may be located on the card 10 so as to be visible from a rear surface 20 (see FIG. 3) of the card 10.

Figure 2:
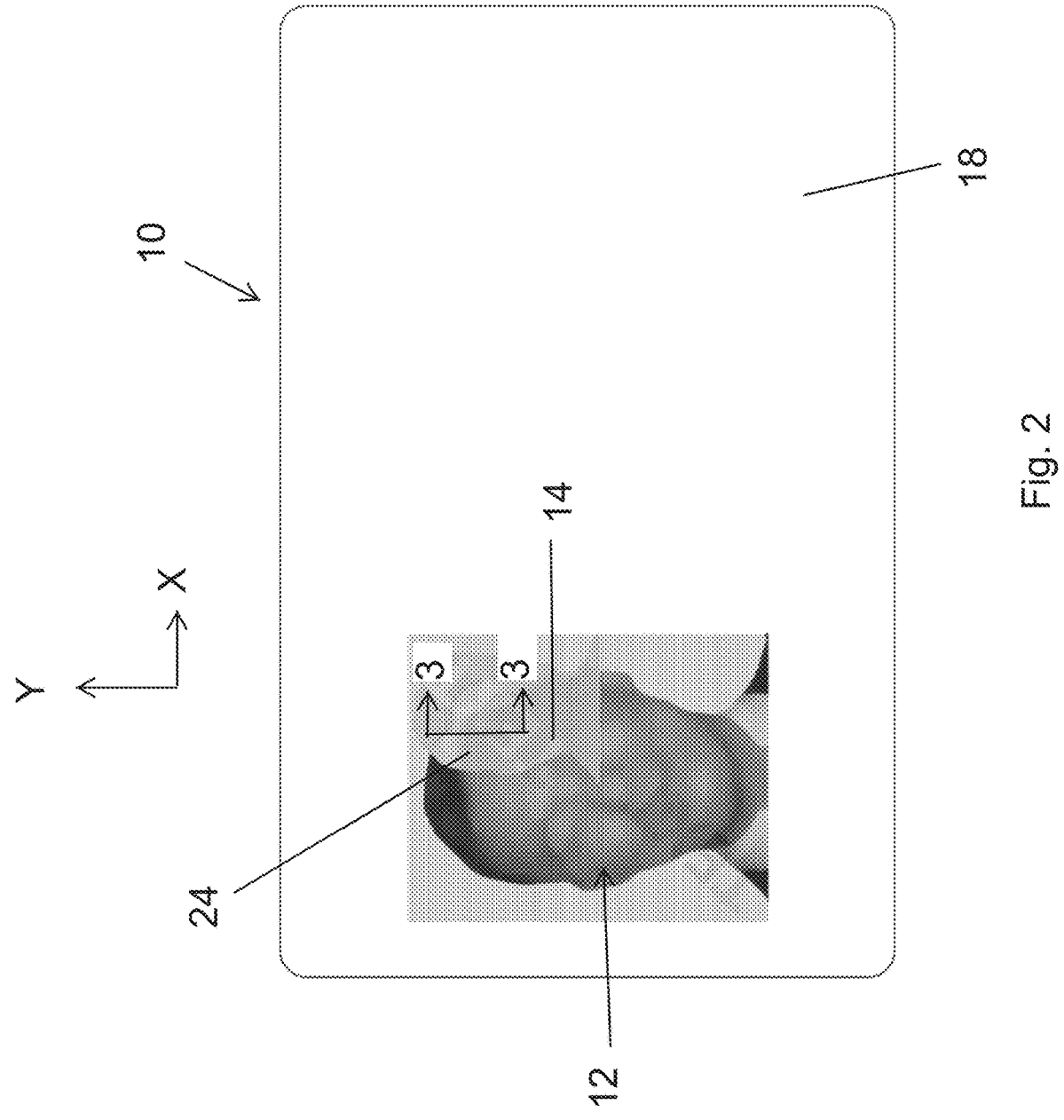
FIG. 2 is a view similar to FIG. 1 but with a lens structure described herein formed over a portion of the printed image and the security text.

FIG. 2 depicts the image 12 with the lens structure described further below formed on the card 10 over a portion of the image 12 and a portion of the text 14. With the lens structure in place as depicted in FIG. 2, the text 14 is readily discernible to the naked eye and can be read through the lens structure using the naked eye. In contrast to FIG. 1 where the lens structure is not present and the text 14 is either not discernible to the naked eye or visible, or is not clearly discernible to the naked eye.

Figure 3:
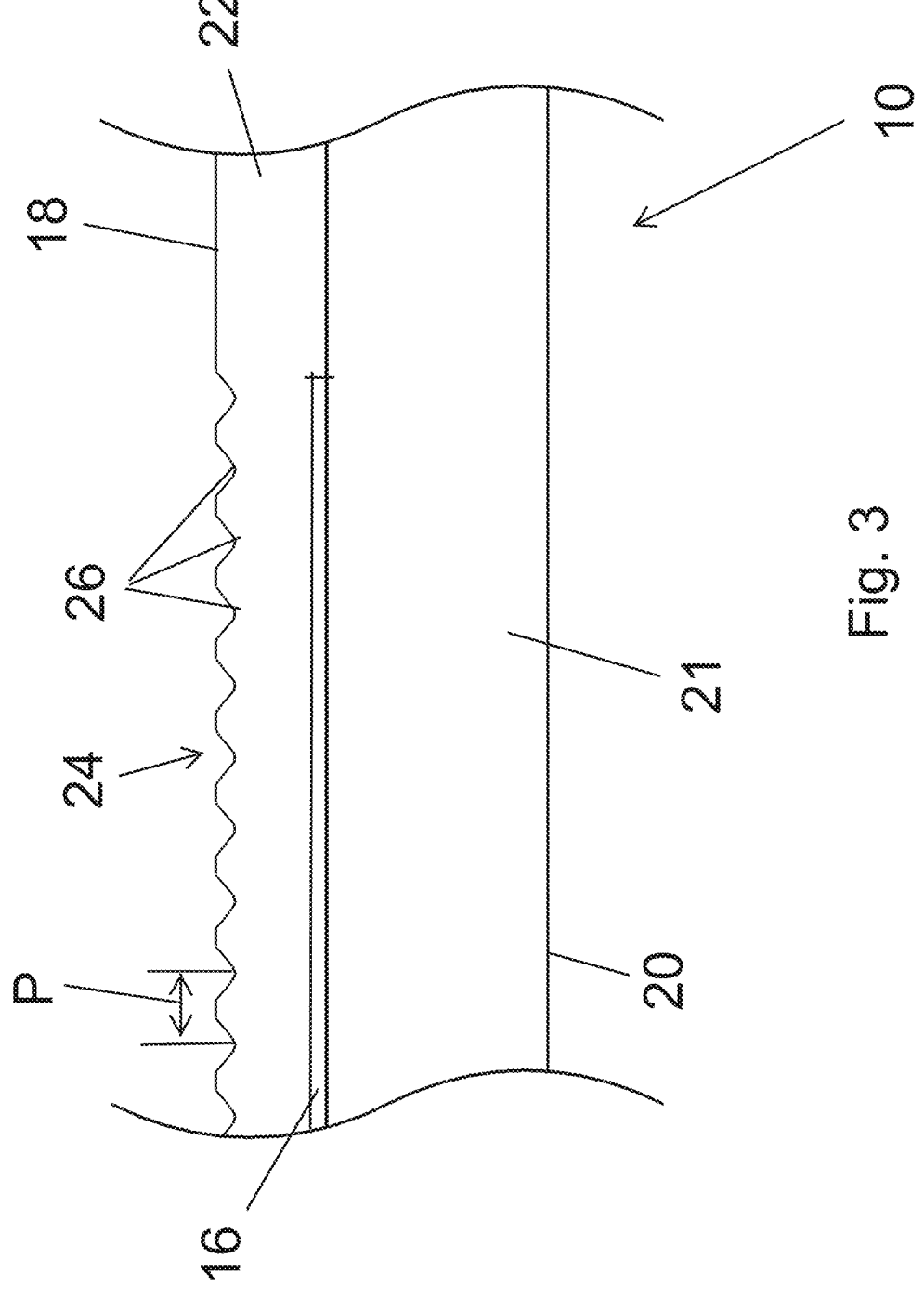
FIG. 3 is a partial cross-sectional view of the personalized plastic identification document taken along line 3-3 of FIG. 2.

With reference to FIG. 3, the plastic card 10 can be formed from a plurality of individual layers that are layered upon one another to form the card body or card substrate. The card 10 can include other features known in the art including, but not limited to, a programmable integrated circuit chip, a magnetically encodable magnetic stripe, and personalized data such as the name of the intended card holder, an address of the card holder, an account number or other unique identification number assigned to the card holder, a card verification value number, and the like. The card 10 can further include non-personalized data or features including, but limited to, printed graphics, a logo of the card issuer, a bank name, and the like.

FIG. 3 depicts the laser receptive layer 16 embedded within the card 10 and disposed on a base layer 21. At least one layer 22 is disposed on the base layer 21 and over the laser receptive layer 16 and forms the front surface 18. The layer 22 may be a laminate or a coating that is substantially transparent to allow viewing of the image 12 and the text 14 in the laser receptive layer 16. A lens structure 24 is formed in the layer 22 at the front surface 18 so that the lens structure 24 overlays at least a portion of the image 12 and the text 14. The lens structure 24 allows viewing of the image 12 and the text 14 that underlies the lens structure 24, and the lens structure 24 is configured to render the text 14 under the lens structure 24 discernible and readable to the naked eye by viewing through the lens structure 24. The lens structure 24 can render the underlying text 14 discernible and readable to the naked eye via refraction or diffraction. In one embodiment the lens structure 24 may magnify the underlying text 14. However one chooses to describe the action of the lens structure 24, the lens structure 24 makes the underlying text 14 discernible and readable to the naked eye.

Referring to FIG. 3, the lens structure 24 comprises a plurality of individual lenses 26. The lenses 26 comprise depressions, formed by a laser, that protrude into the surface 18. The lenses 26 may be referred to as microscopic in that the lenses may be so small as to be visible only with a microscope. The lenses 26 are individually customizable by the laser. The lenses 26 can be identical to one another, or some or all of the lenses can vary in depth into the surface 18, size (both lateral (i.e. Y-axis direction in FIG. 2) size and longitudinal (i.e. X-axis direction FIG. 2) size), density (i.e. number of lenses per unit area), spacing or pitch, and the like. FIG. 3 depicts the lenses 26 as having a constant spacing or pitch P (i.e. the distance between the trough or valley of each lens 26 is the same over the lens structure 24), a constant depth into the surface 18, and a constant size. In addition, the lenses 26 in FIG. 3 may have longitudinal axes that extend in the X-axis direction (see FIG. 2), or that extend in the Y-axis direction (see FIG. 2), or that extend at any angle to the X-axis or Y-axis directions. The lenses 26 in FIG. 3 may also be individual lenses that are discontinuous in the X-axis and Y-axis directions similar to the lenses shown in FIG. 5. The lens structure 24 may overlay a portion of the image 12 and the text 14 as depicted in FIGS. 2-3, or the lens structure 24 may overlay the entirety of the image 12 and the text 14.

Figures 5, 5A, 5B:
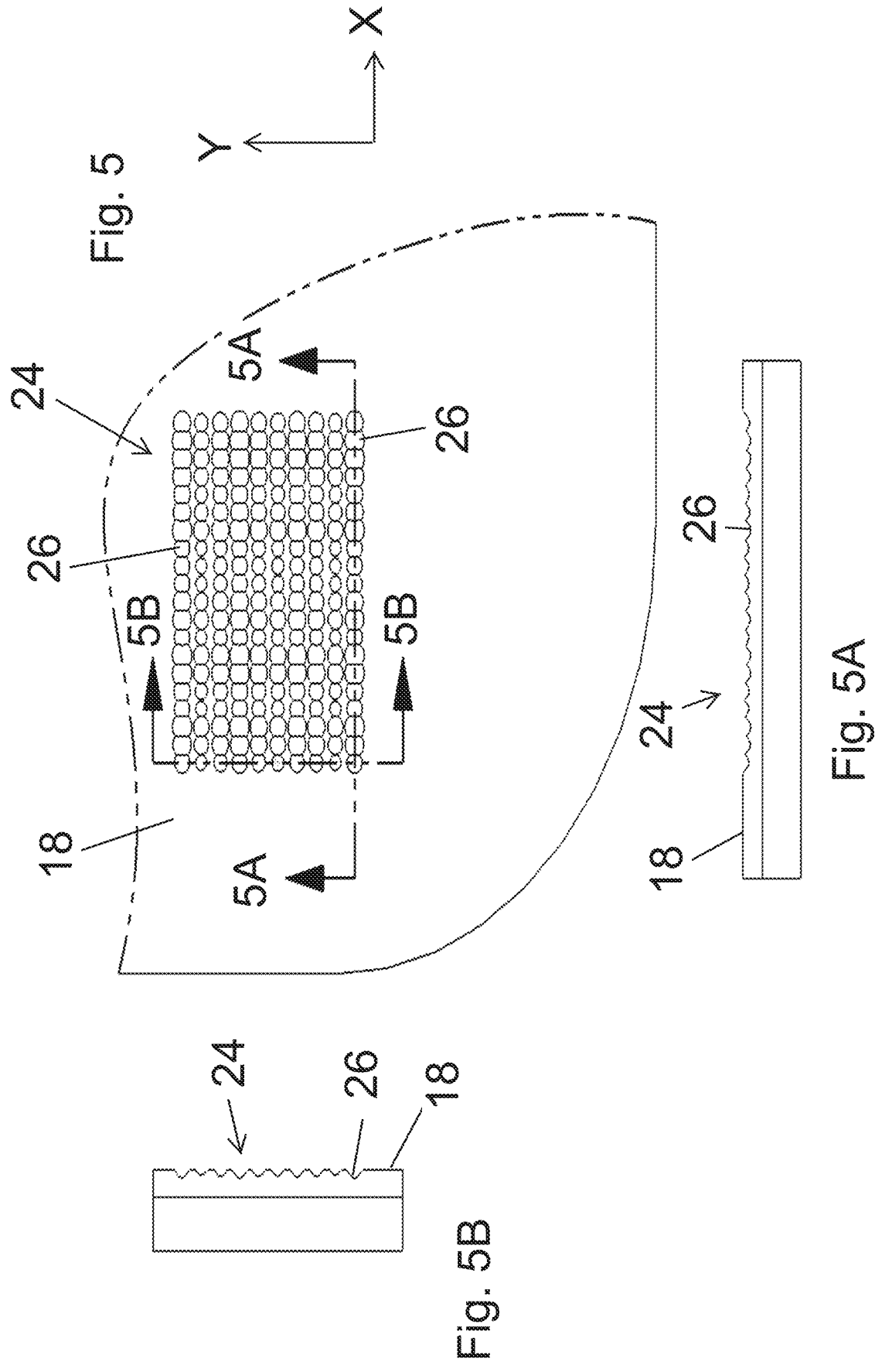
FIG. 5 is a top view of a portion of a lens structure where the lenses have variable spacing, varying depth, and/or variable size along different axes.
FIG. 5A is a cross-section view along line 5A-5A of FIG. 5.
FIG. 5B is a cross-section view along line 5B-5B of FIG. 5.

FIGS. 5, 5A and 5B depict an example of the lens structure 24 with variations in lens spacing/pitch, variations in shape, and/or variations in depth. FIG. 5 depicts the lenses 26 as being individual structures that are discontinuous in the X-axis and Y-axis directions. FIG. 5 also depicts the individual lenses as having varying shapes from one another both in the X-axis direction and the Y-axis direction. However, the shapes could vary only in the X-axis direction or only in the Y-axis direction or at an angle to the X-axis and the Y-axis. FIGS. 5A and 5B depict the lenses 26 as having varying depths into the surface 18. along the X-axis direction and the Y-axis direction. However, the depths could vary only in the X-axis direction or only in the Y-axis direction or at an angle to the X-axis and the Y-axis. FIGS. 5, 5A and 5B also depict the lenses 26 as having variable spacing or pitch (i.e. the distance between the trough or valley of some or all of the lenses 26 varies over the lens structure 24). However, the lens spacing could vary only in the X-axis direction or only in the Y-axis direction or at an angle to the X-axis and the Y-axis. In another embodiment, the lenses 26 can be tightly formed along one axis (such as the X-axis or the Y-axis) creating a variable depth line-like lens along one axis, and spaced apart along the opposite axis (such as the Y-axis or the X-axis in FIG. 5).

The lens structure 24 may be formed by a laser. In one embodiment, the laser used to form the lens structure 24 may differ from the laser used to perform the laser marking to form the image 12 and the text 14. In one embodiment, the laser used to form the lens structure 24 may be a $CO_2$ laser. An example of a suitable $CO_2$ laser that can be used is the laser used in the Laser Surface Imaging module from Entrust Corporation of Shakopee, Minnesota.

Figure 4:
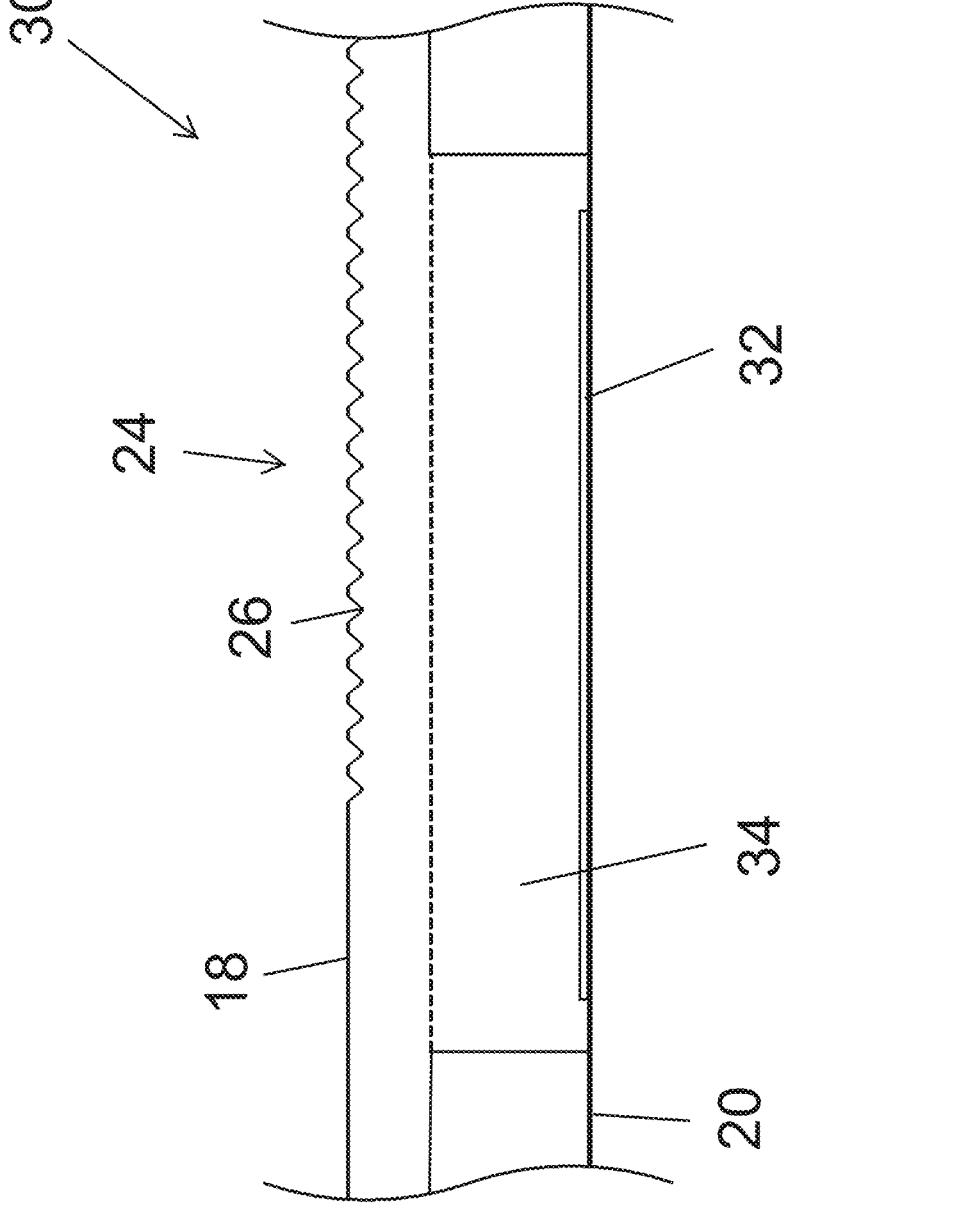
FIG. 4 is a cross-sectional view of a personalized plastic identification document having a transparent window with a security feature and a lens structure described herein.

FIG. 4 illustrates another embodiment of a plastic card 30 described herein. In FIG. 4, elements that are similar to elements in FIG. 3 are referenced using the same reference numerals. In FIG. 4, the lens structure 24 overlays at least a portion of a security feature 32 that is provided in or on a transparent window 34 formed on the card 30. The security feature can be an image of the intended document holder, text, a combination of an image of the intended document holder and text, an MLI/CLI security feature, or any other security feature. An example of a window formed in a plastic card is disclosed in US 205/0210107.

In FIG. 4, the security feature 32 is formed in or on the window 34 at or on the rear surface 20, while the lens structure 24 is formed in the window 34 on the front surface 18. The result is that the lens structure 24 overlies at least a portion of the, or the entire, security feature 32. The security feature 32 can be formed before the lens structure 24, or the lens structure 24 can be formed before the security feature 32. In another embodiment, the security feature 32 is formed in or on the window 34 at or on the front surface 18 (for example at the location of the lens structure 24 shown in FIG. 4), while the lens structure 24 can be formed in the window 34 on the rear surface 20 (for example at the location of the security feature 32 in FIG. 4).

FIG. 6 is a schematic depiction of one embodiment of a large volume batch production document processing system 50 that can be used to process the cards 10, 30 (and passports) described herein. The document processing system 50 is configured to process multiple documents at the same time, with the documents being processed in sequence, with the documents proceeding generally along a document transport direction/transport path X. The system 50 in FIG. 6 is often referred to as a central issuance processing system that processes documents in high volumes, for example on the order of high hundreds or thousands per hour, and employs multiple processing stations or modules to process multiple documents at the same time to reduce the overall per document processing time. Examples of such large volume document processing machines include the MX and MPR family of central issuance processing machines available from Entrust Corporation of Shakopee, Minnesota. Other examples of central issuance processing machines are disclosed in U.S. Pat. Nos. 4,825,054, 5,266,781, 6,783,067, and 6,902,107, all of which are incorporated herein by reference in their entirety.

The system 50 in FIG. 6 can include a document input 52, one or more optional document processing stations 54 downstream from the document input 52, a print station 56, a first laser 58, a second laser 60, one or more optional additional document processing stations 62, and a document output 64. The system 50 can include additional processing stations as would be understood by persons of ordinary skill in the art.

The document input 52 can be configured to hold a plurality of plastic cards or passports waiting to be processed and that mechanically feeds the documents one by one into the system 50 using a suitable document feeder. The documents are initially introduced into the one or more optional document processing stations 54 if they are present in the system. The stations 54, if present, can include a chip testing device that is configured to perform contact or contactless testing of an integrated circuit chip on each document to test the functionality of the chip, as well as program the chip. Testing the functionality of the chip can include reading data from and/or writing data to the chip. The construction and operation of chip testing devices in document processing systems is well known in the art. The stations 54 can also include a magnetic stripe read/write testing device (when the documents are cards) that is configured to read data from and/or encode data on a magnetic stripe on each card (if the cards include a magnetic stripe). The construction and operation of magnetic stripe read/write testing devices in document processing systems is well known in the art.

The print station 56 can be any type of printing mechanism that is suitable for generating printing on the identification documents. For example, the print station 56 can be configured to perform DOD printing, retransfer printing, or dye diffusion thermal transfer printing. In some embodiments, for example in the case of DOD printing using ultraviolet (UV) curable ink, a plasma treatment station and/or a UV-curing station can be provided that works with the print station 56.

The first laser 58 may be the laser used to create the lens structure. The laser used in the first laser 58 can be any laser that is suitable for creating the lens structure. For example, the laser 58 can be a $CO_2$ laser. The second laser 60 may be the laser used to generate the image and the security text in the laser receptive layer, or used to create the security feature in FIG. 4. The laser used in the second laser 60 can be any laser that is suitable for performing the laser marking to create the image and the security text, or to create the security feature. For example, the second laser 60 may be a non-$CO_2$ laser such as, but not limited to, a diode-pumped solid-state laser (DPSSL). In an embodiment, the lens structure and the laser marking in the laser receptive layer could be generated using the same type of laser in which case a single one of the lasers 58, 60 can be provided and used.

In FIG. 6, the second laser 60 is depicted as being positioned after the first laser 58 whereby the lens structure is created first followed by transporting the card into the second laser 60 for generating the image and the security text in the laser receptive layer, or creating the security feature. Alternatively, the card could be transported through the first laser 58 without any lasing occurring and into the second laser 60 to generate the image and the security text (or other security feature), with the card then being reversed in direction back into the first laser 58 to generate the lens structure. It is also possible to locate the second laser 60 before the first laser 58. In such an arrangement, the image and the security text could be formed first in the laser receptive layer followed by generating the lens structure using the laser 58. Alternatively, the card could be transported through the second laser 60 without any lasing occurring and into the first laser 58 to generate the lens structure, with the card then being reversed in direction back into the second laser 60 to generated the image and the security text (or other security feature).

The one or more additional document processing stations 62 can be stations that are configured to perform any type of additional document processing. Examples of the additional document processing stations 62 include, but are not limited to, an embossing station having an embosser configured to emboss characters on the documents, an indent station having an indenter configured to indent one or more characters on the documents, a lamination station with a laminator configured to apply one or more laminates to the documents, a topcoat station with a topcoat applicator configured to apply a topcoat to one or more of the surfaces of the documents, a security station with a security feature applicator configured to apply one or more additional security features to one or more of the surfaces of the documents, and one or more document reorienting mechanisms/flippers configured to rotate or flip a document 180 degrees for processing on both sides of the documents. In addition, as indicated in dashed lines, one or more of the additional processing stations 62 can be located between the first laser 58 and the second laser 60. Alternatively, one or more of the document processing stations 62 can be located between the print station 56 and the first laser 58.

The document output 64 can be configured to hold a plurality of documents after they have been processed. In this configuration, the document output 64 is often termed a document output hopper. The construction and operation of output hoppers is well known in the art.

FIG. 7 is a schematic depiction of another embodiment of a document processing system 70 that can be used to process the cards 10, 30 (and passports) described herein. In this embodiment, the card processing system 70 can be configured as a desktop card processing system that is typically designed for relatively smaller scale, individual card personalization in relatively small volumes, for example measured in tens or low hundreds per hour, often times with a single card being processed at any one time. These card processing machines are often termed desktop processing machines because they have a relatively small footprint intended to permit the processing machine to reside on a desktop. Many examples of desktop processing machines are known, such as the SD or CD family of desktop card printers available from Entrust Corporation of Shakopee, Minnesota. Other examples of desktop processing machines are disclosed in U.S. Pat. Nos. 7,434,728 and 7,398,972, each of which is incorporated herein by reference in its entirety.

In FIG. 7, elements in the system 70 that are similar in construction or functionality to elements in the system 50 in FIG. 6 are referred to using the same reference numerals. In FIG. 7, the system 70 is illustrated as including the document input 52 and the document output 64 at one end of the system 70. In the type of system depicted in FIG. 7, the document input 52 and/or the document output 64 can be provided at other locations in the system 70. For example, in one embodiment, the document input 52 can be located at a position higher up in the system, for example at the top of the system above the transport path X between the ends of the system 70. In another embodiment as depicted in dashed lines in FIG. 7, the document input 52 and the document output 64 can be located at the opposite end of the system 70.

The one or more optional document processing stations 54, the print station 56, the first laser 58, and the second laser 60 can be arranged relative to one another in the manner indicated in FIG. 7 and as described above for FIG. 6. In an embodiment, a card flipper 72 can be provided at the end of the system 70 that is configured to flip or rotate the card 180 degrees so that the card surface previously facing upward is now facing downward, and the card surface previously facing downward is now facing upward. The card is then reversed back toward the second laser 60 and the other processing stations for additional processing on the now upwardly facing card surface and transport to the output 64. If the card flipper 72 is not present, the card can simply be reversed in direction after the second laser 60 is finished, and the card ultimately transported to the output 64.

In the systems 50, 70 in FIGS. 6 and 7, the documents can be transported throughout the systems 50, 70 and moved along the document transport path X by one or more suitable mechanical document transport mechanisms (not shown). Mechanical document transport mechanism(s) for transporting cards and passports in document processing equipment of the type described herein are well known in the art. Examples of mechanical document transport mechanisms that could be used are known in the art and include, but are not limited to, transport rollers, transport belts (with tabs and/or without tabs), vacuum transport mechanisms, transport carriages, and the like and combinations thereof. Transport mechanisms for plastic cards are well known in the art including those disclosed in U.S. Pat. Nos. 6,902,107, 5837991, 6,131,817, and 4,995,501 and U.S. Published Application No. 2007/0187870, each of which is incorporated herein by reference in its entirety. A person of ordinary skill in the art would readily understand the type(s) of document transport mechanisms that could be used, as well as the construction and operation of such document transport mechanisms.

FIG. 8 illustrates an example method 80 of processing an identification document like the card 10 in FIGS. 1-3. The processing of the card 30 in FIG. 4, and the processing of passports would follow generally similar steps. In FIG. 8, dashed lines indicate processing steps that are optional and may not be performed in every instance. At box 82, the identification document to be processed is input into the system. If the document includes a magnetic stripe, then an optional step at box 84 can be performed where the magnetic stripe is tested and/or encoded with data. Similarly, if the document includes an integrated circuit chip, then an optional step at box 86 can be performed where the chip is tested and/or programmed with data. At box 88, printing on the document can optionally be performed, and at box 90 additional processing can be performed if necessary. At box 92, the document is then input into the first laser and the lens structure is formed on the document using the first laser. Thereafter, at box 94, the document is then input into the second laser and the image and the security text are generated in the laser receptive layer of the document using the second laser. At box 96, additional processing may then optionally be performed on the document, with the processed document ultimately being output into the output at box 98.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of processing a plastic identification document substrate to create a personalized plastic identification document, comprising:

using a first laser of a document processing system to form a lens structure on the plastic identification document substrate, wherein the first laser is a $CO_2$ laser; and thereafter using a second laser of the document processing system to form an image of an intended holder of the personalized plastic identification document on the plastic identification document substrate along with text within the image, wherein the image and the text are positioned to at least partially underlie the lens structure.

2. The method of claim 1, wherein the personalized plastic identification document comprises a plastic card or a plastic page of a passport.

3. The method of claim 1, wherein the text comprises alphanumeric text and/or a text symbol.

4. The method of claim 1, further comprising a laser receptive layer on the plastic identification document substrate, and comprising forming the image and the text in the laser receptive layer.

5. The method of claim 1, comprising forming the image and the text so that the lens structure overlays an entirety of the image.

6. The method of claim 1, comprising forming the lens structure to include lenses that have one or more of the following:

a single common pitch or a variable pitch;

a constant depth or a variable depth;

a same size or varying sizes.

7. A method of processing a plastic identification document substrate to create a personalized plastic identification document, comprising:

using a laser to form a lens structure on the plastic identification document substrate; and thereafter using a laser to form an image of an intended holder of the personalized plastic identification document on the plastic identification document substrate along with text within the image, wherein the image and the text are positioned to at least partially underlie the lens structure, wherein the laser used to form the lens structure is a $CO_2$ laser, and the laser used to form the image and the text is a non-$CO_2$ laser.

8. A method of processing a plastic identification document substrate to create a personalized plastic identification document, comprising:

using a laser to form a lens structure on the plastic identification document substrate; and thereafter using a laser to form an image of an intended holder of the personalized plastic identification document on the plastic identification document substrate along with text within the image, wherein the image and the text are positioned to at least partially underlie the lens structure, wherein after forming the lens structure, transporting the plastic identification document substrate to the laser used to form the image and the text.

9. The method of claim 1, wherein the second laser is a non-$CO_2$ laser.

\* \* \* \* \*